United States Patent [19]

Thompson

[11] Patent Number: 4,572,237
[45] Date of Patent: Feb. 25, 1986

[54] FUNCTION ASSIST CONTROL FOR PRESSURE RELIEF VALVE

[75] Inventor: Leonard J. Thompson, Wrentham, Mass.

[73] Assignee: Value Oriented Technology Inc., Wrentham, Mass.

[21] Appl. No.: 639,419

[22] Filed: Aug. 10, 1984

[51] Int. Cl.⁴ .............................................. F16K 31/126
[52] U.S. Cl. .................................... 137/487.5; 251/61
[58] Field of Search ................ 137/487.5, 489.5, 488, 137/86, 85; 251/61.2, 61

[56] References Cited

U.S. PATENT DOCUMENTS

| | | | |
|---|---|---|---|
| 1,229,720 | 6/1917 | Ebeling | 137/489.5 |
| 2,675,819 | 4/1954 | Eckman | 137/86 |
| 2,718,896 | 9/1955 | Jones | 137/86 X |
| 2,955,612 | 10/1960 | Moser | 137/489.5 |
| 3,124,147 | 3/1964 | Hallett | 137/86 |
| 3,548,866 | 12/1970 | Kaiser | 137/487.5 |
| 4,349,885 | 9/1982 | Thompson | 137/487.5 X |

Primary Examiner—Alan Cohan
Attorney, Agent, or Firm—Kenway & Jenney

[57] ABSTRACT

A dual bellows apparatus for controlled, programmed application of forces to an extension of the spindle of a spring loaded safety relief valve. A controller which may be remote from the valve is adapted to perform a plurality of functions on the valve while installed in an operating system by pressurization of the respective bellows. These functions include force-assisted opening of the valve, force-assisted blowdown, anti-simmer control and measurement of the set pressure.

11 Claims, 1 Drawing Figure

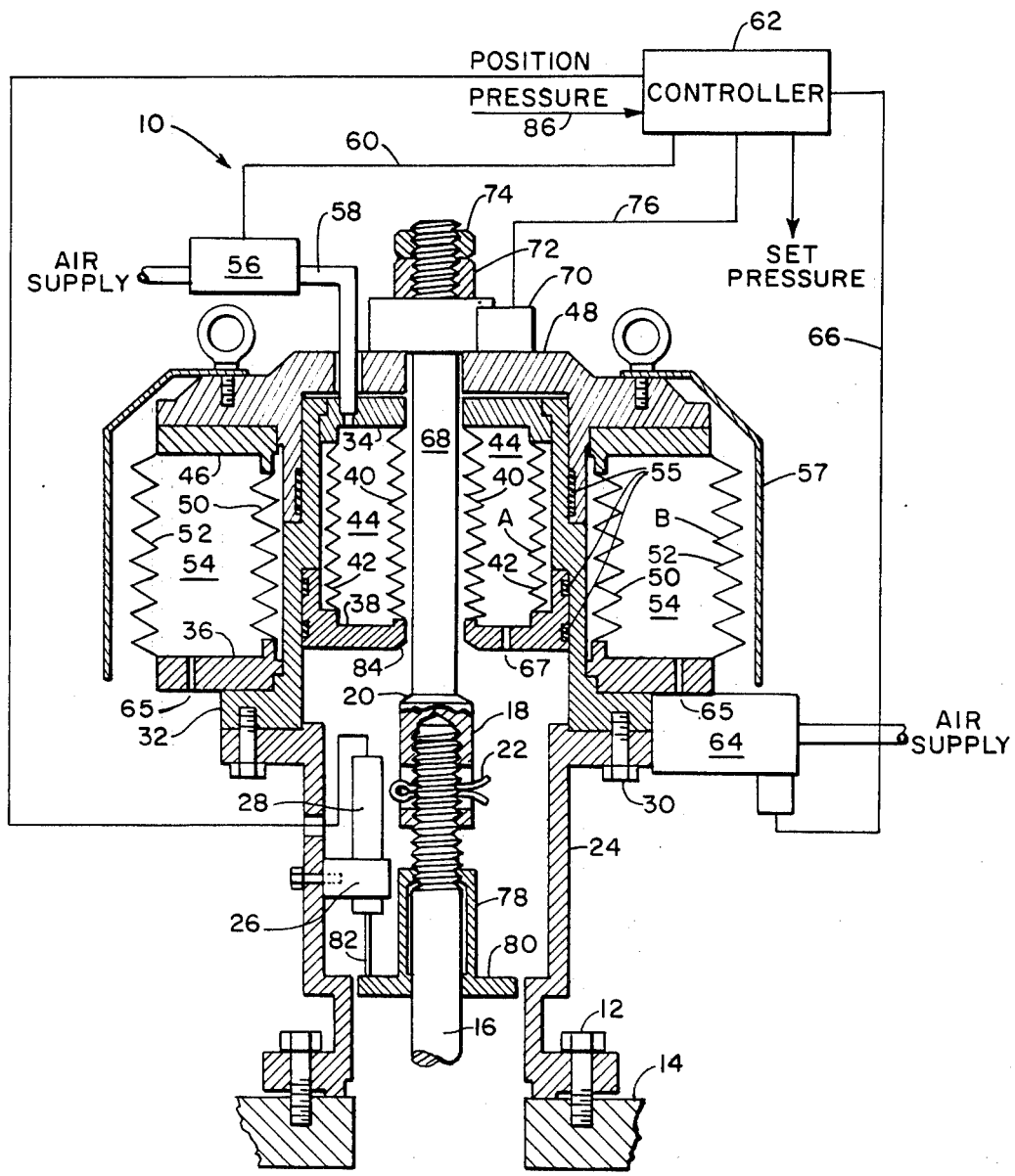

FUNCTION ASSIST CONTROL FOR PRESSURE RELIEF VALVE

BACKGROUND OF THE INVENTION

This invention relates generally to safety and safety relief valves of the spring loaded self-actuated type, that is, relief valves for pressurized systems in which the valve member is biased toward its seat by a spring force oppposed to the system pressure acting on the valve member. More particularly, the invention relates to apparatus and systems adapted for assisting the functions of the relief valve and for measuring its set pressure.

In my U.S. Pat. No. 4,349,885 dated Sept. 14, 1982, I have described a set pressure measuring system for safety relief valves wherein pneumatic pressure is applied to a bellows adapted for the application of a force to the spindle of the relief valve. A controller is adapted for pressurizing the bellows with the relief valve installed and operating in the pressurized system at a pressure below the set pressure. By "set pressure," which is also referred to as the self-actuation pressure, is meant the system pressure at which the pressure force on the relief valve tending to open it just equals the bias spring force holding the valve against the seat. According to said patent, the pressure applied to the bellows is elevated to a value sufficient to produce a force which, when added to the force of the then-existing system pressure, will equal the bias spring force on the valve, allowing the valve to lift open. The latter event, called the "test time," is detected by a linear variable differential transformer or LVDT, which is also connected to the controller. The controller is further provided with means to measure the system pressure and the force applied by the bellows to the valve spindle at the test time. Computer functions associated with the controller then derive the actual set pressure of the relief valve as the sum of the system pressure at the test time and a computed increment of the system pressure that would provide a force equal to the force applied by the bellows at the test time. In this manner the apparatus of said patent has provided many advantages in its primary function of measuring the relief valve set pressure and detecting any drift therein while in service. Such advantages include the ability to verify or measure the set pressure from a remote location with the valve in place and the pressurized system in operation. This reduces the risk of operator exposure when the relief valve is installed in a hazardous environment, as in a boiling water nuclear power plant, for example. Typically, it takes only one operator a matter of minutes to verify the set pressure on a large number of relief valves without interfering with the over-pressure protection function of the valves. In practice, the system has produced great economies and reduced the need for system shut-down, without sacrifice of the safety precautions required by regulatory agencies.

In addition to measuring the set pressure of a safety relief valve and detecting any drift therein, it has been found desirable to ensure that in operation the relief valve remains fully seated until the system pressure reaches the value at which the valve is to open, that the valve does open at the desired system pressure, and that the valve closes at the desired blowdown pressure valve. A common problem particularly with steam safety valves is that they leak or "simmer" at pressures somewhat below the set pressure. Also, it is extremely important to ensure a precise blowdown especially in relief valves for nuclear systems to limit the release of system fluid.

Accordingly, one of the objects of the present invention is to provide a function assist control for a pressure relief valve that will ensure its opening at a predetermined pressure notwithstanding any drift in its set pressure.

A second object is to provide a function assist control, also for opening the pressure relief valve, which may be used to demonstrate its full relieving capability at a time when the system pressure is actually well below the valve set pressure, for example as low as 75 percent of the set pressure.

A third object of the invention is to provide a function assist control for urging the valve toward its seated position upon reaching the blowdown pressure.

A fourth object of the invention is to provide an anti-simmer control that is selectively operative to hold the relief valve against the seat during normal system operation.

A fifth object is to accomplish the foregoing function assist controls by means that will also permit the use of the set pressure measuring system of said patent from a remote location, so that an operator is not required to enter a hazardous containment where the relief valve may be located.

With the above and other objects hereinafter appearing in view, the features of this invention include a concentric dual-bellows, externally mounted function assist control for a spring-loaded, self-actuated safety relief valve. An outer bellows functions in a manner similar to the bellows described in said patent for applying a force to the valve spindle tending to open the valve. A second bellows is provided for applying, under predetermined operating conditions, a force to the spindle tending to close the relief valve.

This bellows arrangement, when associated with a suitable controller adapted to respond to the system pressure and to control the pressurization and depressurization of the bellows selectively, provides great flexibility in the application of the function assist controls to the valve.

Further features of the invention comprise other elements of the apparatus adapted to perform the functions described in said patent including the measurement or verification of the set pressure at which the relief valve will be self-actuated.

DESCRIPTION OF THE DRAWING

The appended drawing is an elevation in section of the presently preferred embodiment of the function assist control of the present invention, as mounted upon and externally of the bonnet of a typical safety relief valve.

DETAILED DESCRIPTION

Referring to the drawing, the function assist control of this invention is shown generally at 10 and comprises an assembly mounted by cap screws 12 on the bonnet 14 of a spring-loaded self-actuated safety relief valve. A spindle 16 is attached to the closure member of the valve (not shown) and extends through the bonnet 14 outwardly in the direction toward which the relief valve opens. The spindle is threaded into an end of a spindle extension 18 having a shoulder 20. A cotter pin 22 is received through holes in the spindle extension and spindle to prevent relative rotation thereof after assembly.

An adaptor 24 of generally tubular shape having flanges at both ends is fastened to the mount 14 by the bolts 12 and supports the mount 26 of a linear variable differential transformer or LVDT 28 having the function described in said patent. The upper flange of the adaptor as viewed in the drawing is attached by screws 30 to a sleeve-shaped center support 32. The center support is secured preferably by welding to the fixed upper platen or end piece 34 of an inner bellows assembly A, and secured by fasteners (not shown) or equivalent means to the fixed lower platen or end piece 36 of an outer bellows assembly B. The bellows assembly A comprises a movable lower platen or end piece 38 slidable on an inner surfce of the center support 32 and a pair of concentric bellows 40 and 42 respectively attached to the end pieces 34 and 38 to form an annular enclosure 44. The bellows assembly B also includes a movable upper platen or end piece 46 attached to an annular load plate 48 which is slidable on an outer surface of the center support 32, and a pair of concentric bellows 50 and 52 respectively attached to the end pieces 46 and 36 to form an annular enclosure 54. Optionally, the end piece 46 and the load plate 48 may be one integral piece. Annular glides 55 of a suitable low friction material serve to reduce the friction between the center support and the movable ends of the respective bellows.

An outer sleeve housing 57 is provided and secured to the load plate 48 to serve as protection for the bellows assembly B.

From the foregoing description it will be evident that the adaptor 24 and center support 32 are secured to the valve bonnet, that the load plate 48 is axially slidable on the center support by the application of pressure to the enclosure 54 formed by the bellows assembly B, and that the platen or end piece 38 is also slidable on the center support by the application of pressure to the enclosure 44 of the bellows assembly A.

Pressurized air is supplied to a valve 56 connected to the enclosure 44 by a tube 58 passing with clearance through the load plate 48 and attached to the end piece 34. The valve 56 is connected by a control lead 60 to a controller 62 of the general type described in said patent but incorporating the additional control features hereinafter more fully described. Similarly, pressurized air is supplied to a three-way valve 64 connected by a control lead 66 to the controller. The valve 64 is adapted to supply air under pressure to the enclosure 54 of the bellows assembly B, or to exhaust air from said enclosure as required by the programming of the controller.

Bleed ports 65 and 67 may be provided in the platens of either or both of the bellows assemblies, if desired. These ports are sufficiently small to permit the pressurization of the respective enclosures 44 and 54 when called for by the controls, but permit these enclosures to be exhausted whenever the air supply thereto is shut off.

The spindle extension 18 includes an integral load rod 68 extending with clearance through central apertures in the bellows assembly A and the load plate 48. The load rod further extends through a central aperture in a spindle load sensor 70, and is threaded to a take-up nut 72 and jamb nut 74.

From the foregoing description it will be evident that upon the application of pneumatic pressure to the bellows assembly B a force is applied through the load plate 48 and the spindle load sensor 70 to the load rod 68, the force being thereby applied to the relief valve member in a direction tending to open it. The magnitude of this force is transmitted through a line 76 to the controller, the operation in these respects being similar to that described in said patent. Also, a sensor plate 78 is received over the spindle 16 and provides a bearing surface 80 for the core rod 82 of the LVDT as described in said patent.

A tapered bearing surface 84 is formed on the inner annular aperture of the platen or end piece 38 for bearing on the shoulder 20 of the spindle extension 18 under certain conditions as hereinafter described. When bearing upon the shoulder 20, the bellows assembly A is adapted for applying a closing force to the relief valve member upon the application of pneumatic pressure to the enclosure 44. This will assist the closing of the valve during blowdown, and will further assist in holding the relief valve against the seat during normal system operation, if desired.

The controller 62 is adapted to cause the apparatus to perform a number of functions consistently with the above-described objects of this invention, by suitable control of the pneumatic valves 56 and 64 together with the processing of information from the LVDT 28, the system pressure applied to a line 86, and the spindle load sensor 70. The following description provides an example for purposes of explanation but is not intended to limit the scope of the invention, as will be evident therefrom.

In operation, assume that the system pressure applied to the relief valve is at any value below a predetermined value, for example 75 percent of the self-actuation point or set pressure of the relief valve, the latter being for example 1,000 psig. Under these conditions the controller 62 does not apply pneumatic pressure to either of the bellows assemblies A or B, and accordingly, no force is applied by either bellows to the load rod 68. The parts of the apparatus may then be in the relative positions depicted in the drawing.

If the system pressure is elevated to the predetermined value of 75 percent of the set pressure, for example 750 psig., the controller operates the valve 56 to pressurize the bellows assembly A sufficiently to bring the surface 84 into bearing engagement with the shoulder 20 on the spindle extension 18. If the system pressure is elevated above this value, the force applied by the bellows assembly A will tend to hold the relief valve in closed position. This is referred to as an "anti-simmer" or "gagging" function. The pressures at which this function is performed can be varied as desired by the controller 62. In this illustrative example, the normal system operating pressure is assumed to be 90 percent of the set pressure value, or 900 psig. in this example, and the bellows assembly A is pressurized to provide a gagging force to the valve when the system pressure is between 75 percent and three percent below the set pressure, the higher pressure limit being 970 psig. in this example.

If the system pressure rises to a value slightly below the set pressure, for example two percent below the set pressure, or any higher pressure, the controller operates the three-way valve 64 to apply pneumatic pressure to the bellows assembly B. This will be effective to provide sufficient additional lifting force through the load plate 48 and load cell 70 to cause the relief valve to open. The additional force supplied by the bellows assembly B is preferably greater than the force increment of a 2 percent change in the system pressure, and therefore the relief valve will open immediately and independently of any drift in the self-actuation pressure that may have occurred. This guarantees the positive opening of the valve.

It is important that the bellows assembly A will not obstruct the opening of the relief valve. This condition can be met by adapting the controller to shut off the pneumatic pressure to the bellows assembly A when the system pressure is at or near the value at which the bellows assembly B is pressurized, as in the described example. Alternatively, by proper design the pressurization of the bellows assembly B may be arranged to provide a force sufficient to overcome that of the bellows assembly A even if the latter remains pressurized, whereby the net force is sufficient to open the relief valve.

After the opening of the relief valve and the consequent reduction in the system pressure caused by the loss of system fluid, a predetermined system blowdown pressure is reached. This pressure may be, for example, 8 percent below the set pressure or 920 psig. in this example. At this pressure value the controller operates the three-way valve 64 to depressurize the bellows assembly B, and to operate the valve 56 to pressurize the bellows assembly A. This will cause the surface 84 to bear on the shoulder 20 of the spindle extension, assisting the bias spring on the relief valve to close it.

It will be apparent that great flexibility is provided with respect to the system pressures at which the respective bellows assemblies A and B are pressurized or depressurized. This provides for operation assist control both for operating the relief valve at a predetermined system pressure and for causing a predetermined blowdown, by the affirmative application of forces to the valve that eliminate any drifts in either the set pressure or the blowdown pressure characteristics of the valve.

In addition to the foregoing functions, the above-described apparatus is adapted to perform the functions of set pressure measurement and verification as fully described in said patent. Therefore, all of the functions, both with respect to set pressure measurement and function assist controls, can be accomplished from remote locations. As explained in said patent, this is especially advantageous for valve installations in harsh environments, for example nuclear power plants.

The nested configuration of the bellows assemblies provides several advantages. First, it provides a compact arrangement which enables installation within a limited space. Second, it provides for easy assembly, with the load plate 48 serving for subassembly of the center support 32 and bellows assemblies prior to assembly on the adapter 24. Third, adjustment by means of the threaded spindle 16 and load rod 68 is readily accomplished.

It is also noted that the described embodiment is all of metal construction, which is an extremely important advantage in harsh environments where elastomeric bladder-type actuators and the like would be subject to damage and possible failure in use.

While the invention has been described with reference to a presently preferred embodiment and exemplary mode of operation, it will be apparent to those skilled in the art that various adaptations, program sequences and controls may be readily adapted to the apparatus for the purposes of specific applications.

I claim:

1. Function assist apparatus for a system pressure relief valve having a valve and valve body including a seat for the valve, said apparatus including
    a spindle extension for the valve,
    first and second fluid responsive means each having one end fixed in relation to the valve body and the other end engageable with the spindle extension, said first fluid responsive means being adapted upon the application of fluid pressure to apply an assisting force to the spindle extension in the opening direction of the valve, said second fluid responsive means having its said other end selectively engageable with or disengageable from the spindle extension and being adapted upon the application of fluid pressure to engage the spindle extension and apply an assisting force thereto in the closing direction of the valve, and
    a controller responsive to the system pressure and adapted to control the application of fluid pressure to said first and second fluid responsive means.

2. Function assist apparatus for a system pressure relief valve having a valve body including a seat for the valve, said apparatus including
    a spindle extension for the valve,
    a sleeve-shaped center support secured to the valve body and surrounding the spindle extension,
    first fluid responsive means forming a first annular enclosure surrounding the center support, fixed at one end in relation thereto, having at the other end a load plate engageable with the spindle extension externally of the center support, and adapted upon the application of fluid pressure to apply an assisting force to the spindle extension in the opening direction of the valve,
    second fluid responsive means forming a second annular enclosure located within the center support, fixed at one end in a relation thereto, surrounding and having its other end engageable with the spindle extension, and being adapted upon the application of fluid pressure to apply an assisting force thereto in the closing direction of the valve, and
    a controller responsive to the system pressure and adapted to control the application of fluid pressure to said first and second fluid responsive means.

3. The apparatus of claim 2, in which at least one of the fluid responsive means comprises a pair of metallic bellows forming an enclosure surrounding the spindle extension, the other fluid responsive means being located substantially between said enclosure and the spindle extension.

4. Apparatus according to claim 3, in which the second fluid responsive means includes a pair of metallic bellows forming an annular enclosure.

5. Apparatus according to claim 2, including a center support adapted to be secured to the valve body, the fixed ends of the first and second fluid responsive means being affixed to the center support and the other ends thereof being independently slidable upon the center support.

6. Apparatus according to claim 2, in which at least one of the fluid responsive means has a bleed port for pressure fluid.

7. Apparatus according to claim 2, including a load sensor in load transmitting relationship between the load plate and the spindle extension and connected to the controller.

8. Apparatus according to claim 2, including means adapted to detect movement of the spindle extension and connected with the controller.

9. Apparatus according to claim 2, in which the controller is adapted to pressurize the first fluid responsive means at a system pressure approximating the set pressure of the valve.

10. Apparatus according to claim 2, in which the controller is adapted to pressurize the second fluid responsive means when the system pressure exceeds a predetermined value below the set pressure of the valve.

11. The apparatus of claim 2, in which said other end of the second fluid responsive means is selectively engageable with or disengageable from the spindle extension.

* * * * *

UNITED STATES PATENT AND TRADEMARK OFFICE
CERTIFICATE OF CORRECTION

PATENT NO. : 4,572,237
DATED : February 25, 1986
INVENTOR(S) : Leonard J. Thompson It is certified that error appears in the above-identified patent and that said Letters Patent is hereby corrected as shown below:

Column 1, line 66, cancel "valve" and substitute --value--

Column 6, line 22, after "having a" insert --valve and--; line 37, cancel "a"

Signed and Sealed this

Twenty-seventh Day of January, 1987

Attest:

DONALD J. QUIGG

Attesting Officer

Commissioner of Patents and Trademarks